US012671149B2

(12) United States Patent
Li et al.

(10) Patent No.: US 12,671,149 B2
(45) Date of Patent: Jun. 30, 2026

(54) BATTERY CONNECTION MODULE

(71) Applicant: Molex, LLC, Lisle, IL (US)

(72) Inventors: Yun-Jin Li, Chengdu (CN); Li-Jun Sun, Chengdu (CN); Yong Lin, Chengdu (CN)

(73) Assignee: Molex, LLC, Lisle, IL (US)

( * ) Notice: Subject to any disclaimer, the term of this patent is extended or adjusted under 35 U.S.C. 154(b) by 741 days.

(21) Appl. No.: 17/985,159

(22) Filed: Nov. 11, 2022

(65) Prior Publication Data

US 2023/0163425 A1     May 25, 2023

(51) Int. Cl.
| | |
|---|---|
| *H01M 50/51* | (2021.01) |
| *H01M 50/503* | (2021.01) |
| *H01M 50/507* | (2021.01) |
| *H01M 50/519* | (2021.01) |

(52) U.S. Cl.
CPC ....... *H01M 50/519* (2021.01); *H01M 50/503* (2021.01); *H01M 50/507* (2021.01)

(58) Field of Classification Search
None
See application file for complete search history.

(56) References Cited

U.S. PATENT DOCUMENTS

2022/0085470 A1* 3/2022 Cho .................... H01H 85/046

FOREIGN PATENT DOCUMENTS

| | | |
|---|---|---|
| CN | 209515832 U | 10/2019 |
| JP | H07321433 A | 12/1995 |
| KR | 20200102188 A | 8/2020 |
| TW | M305460 Y | 1/2007 |

OTHER PUBLICATIONS

Machine translation of KR 20200102188 A.*

* cited by examiner

*Primary Examiner* — Jonathan G Leong
*Assistant Examiner* — Tony S Chuo

(57) ABSTRACT

A battery connection module is used to connect a plurality of batteries, includes a plurality of busbars, a connector, a single layer wiring flexible circuit board and a strengthening back board. The plurality of busbars are used to connect the plurality of batteries, the connector includes a plurality of conductive terminals, the single layer wiring flexible circuit board includes a plurality of terminal connecting points which are used to connect the plurality of conductive terminals and multiple traces which are connected with respective terminal connecting points, the strengthening back board corresponds to the connector in position and is provided on the single layer wiring flexible circuit board; the strengthening back board is provided with an adapting trace thereon; the multiple traces include at least one first trace; the first trace is adapted to the adapting trace on the strengthening back board, and then is adapted back to one of the plurality of terminal connecting points of the single layer wiring flexible circuit board via the adapting trace.

13 Claims, 8 Drawing Sheets

10

100

201

200

BATTERY CONNECTION MODULE

RELATED APPLICATIONS

This application claims priority to Chinese Patent Applications Serial No. 202122905632.0 filed on Nov. 24, 2021, which is incorporated herein by reference in its entirety.

TECHNICAL FIELD

The present disclosure relates to the field of battery technology, and specifically relates to a battery connection module.

BACKGROUND ART

Chinese utility model patent application issuance publication No. CN209515832U discloses a connecting board used to a battery pack and a battery pack integrated cover board assembly, and specifically discloses that a first flexible circuit board and a second flexible circuit board act as battery cell circuit boards, a third flexible circuit board acts as an output circuit board, and an adapting circuit board is a rigid print circuit board. The first flexible circuit board and the second flexible circuit board are connected to the third flexible circuit board 133 via the adapting circuit board. However, the above patent document does not disclose how to solve a problem on circuit cross, and with a combination, for example, of the three flexible circuit boards and the adapting circuit board, material and manufacturing cost are also high.

Japanese patent application publication No. JPH07321433A discloses a thick film circuit board device, and specifically discloses that circuit elements formed on a single layer thick film substrate are electrically connected via conductors, two conductors of the conductors which crosses one conductor of the conductors are provided with a binding wire therebetween for cross wiring. The binding wire is connected to the two conductors by direct welding. Such cross wiring construction with the binding wire is suitable to a hard board, but is not suitable to a flexible circuit board, because the flexible circuit board is deflectable, the binding wire is prone to generate poor binding, be damaged or broken, and additional manufacturing cost will be increased.

In the field of power battery for vehicle, on a battery connection module connecting a plurality of batteries in a battery pack, because a space of the flexible circuit board is limited, and when circuits are connected to connector connecting points, because an arrangement of the connector connecting points may be dense or in multiple rows, or some of the connector connecting points are designated to connect some designated circuits, so a part of the circuits have to cross each other, thus at present, only the flexible circuit board used to the battery connection module necessarily is an at least double layer flexible circuit board, can the circuits cross. However, the double layer or more flexible circuit board is high in price, cost burden is very large. If a single layer flexible circuit board is employed, price is much cheaper, and cost burden may be significantly lowered. However, the above existing technologies in the field of battery connection module cannot solve the problem on circuit cross with the single layer flexible circuit board.

SUMMARY

Therefore, an object of the present disclosure is to provide a battery connection module to solve a problem on circuit cross with a single layer flexible circuit board.

In embodiments of the present disclosure, a battery connection module is used to connect a plurality of batteries, comprises a plurality of busbars, a connector, a single layer wiring flexible circuit board and a strengthening back board. The plurality of busbars are used to connect the plurality of batteries, the connector comprises a plurality of conductive terminals, the single layer wiring flexible circuit board comprises a plurality of terminal connecting points which are used to connect the plurality of conductive terminals and multiple traces which are connected with respective terminal connecting points, the strengthening back board corresponds to the connector in position and is provided on the single layer wiring flexible circuit board; the strengthening back board is provided with an adapting trace thereon; the multiple traces comprise at least one first trace; the first trace is adapted to the adapting trace on the strengthening back board, and then is adapted back to one of the plurality of terminal connecting points of the single layer wiring flexible circuit board via the adapting trace.

According to some embodiments of the present disclosure, the plurality of terminal connecting points comprise at least one first terminal connecting point; the multiple traces further comprise a second trace; a tip of the first trace has an end portion connecting point; one end of the adapting trace has a first end portion connecting point and the other end of the adapting trace has a second end portion connecting point; one end of the second trace has an end portion connecting point, the other end of the second trace is connected to the first terminal connecting point; the end portion connecting point of the first trace is connected to the first end portion connecting point of the adapting trace, the second end portion connecting point of the adapting trace is connected to the end portion connecting point of the second trace of the single layer wiring flexible circuit board.

According to some embodiments of the present disclosure, the single layer wiring flexible circuit board is positioned between the connector and the strengthening back board; the connector employs surface mounted technology, the plurality of terminal connecting points each are constructed as a terminal connecting point which employs a surface welding pad form, tail portions of the plurality of conductive terminals are surface welded to the respective terminal connecting points of the single layer wiring flexible circuit board.

According to some embodiments of the present disclosure, the plurality of terminal connecting points comprise at least one second terminal connecting point; a tip of the first trace has an end portion connecting point; one end of the adapting trace has a first end portion connecting point and the other end of the adapting trace has a second end portion connecting point; the end portion connecting point of the first trace is connected to the first end portion connecting point of the adapting trace, the second end portion connecting point of the adapting trace is directly connected to the second terminal connecting point of the single layer wiring flexible circuit board.

According to some embodiments of the present disclosure, the connector employs through hole type and is nonvoid pin type; the plurality of terminal connecting points each are constructed as a through hole type terminal connecting point; the strengthening back board comprises a plurality of penetrating holes; tail portions of the plurality conductive terminals respectively pass through the plurality of penetrating holes of the strengthening back board and are respectively welded to the plurality of terminal connecting points which each are constructed as the through hole type terminal connecting point; the second end portion connecting point of the adapting trace is constructed on one of the plurality of penetrating holes of the strengthening back board.

According to some embodiments of the present disclosure, the plurality of terminal connecting points comprise at least one third terminal connecting point and at least one fourth terminal connecting point; a tip of the first trace is connected on the third terminal connecting point; the adapting trace has a first end portion connecting point and a second end portion connecting point; the first trace is connected to the first end portion connecting point of the adapting trace via the third terminal connecting point, the second end portion connecting point of the adapting trace is directly connected to the fourth terminal connecting point of the single layer wiring flexible circuit board.

According to some embodiments of the present disclosure, the connector employs through hole type and is a void pin type; the plurality of terminal connecting point each are constructed as a through hole type terminal connecting point; the strengthening back board comprises a plurality of penetrating holes; tail portions of the plurality of conductive terminals pass through the respective penetrating holes of the strengthening back board and are welded to the respective terminal connecting points which each are constructed as the through hole type terminal connecting point; the first trace is connected on the third terminal connecting point which is void and corresponds to a void pin of the connector; the first end portion connecting point and the second end portion connecting point of the adapting trace are respectively constructed on two of the plurality of penetrating holes of the strengthening back board.

According to some embodiments of the present disclosure, the strengthening back board is positioned between the connector and the single layer wiring flexible circuit board.

One embodiment of the present disclosure at least has the following advantages or beneficial effects: the first trace required to be jumped or spanned on the single layer wiring flexible circuit board is adapted to the strengthening back board and is adapted back to the terminal connecting point of the single layer wiring flexible circuit board, so that the strengthening back board functions as not only assembling the connector but also an adapting circuit board for jumping or spanning. Such a manner that directly uses the strengthening back board to solve circuit cross wiring is capable of applying the single layer wiring flexible circuit board on the battery connection module and solving a problem on circuit cross, which significantly lowers cost.

DETAILED DESCRIPTION OF THE PREFERRED EMBODIMENTS

Figure 1:
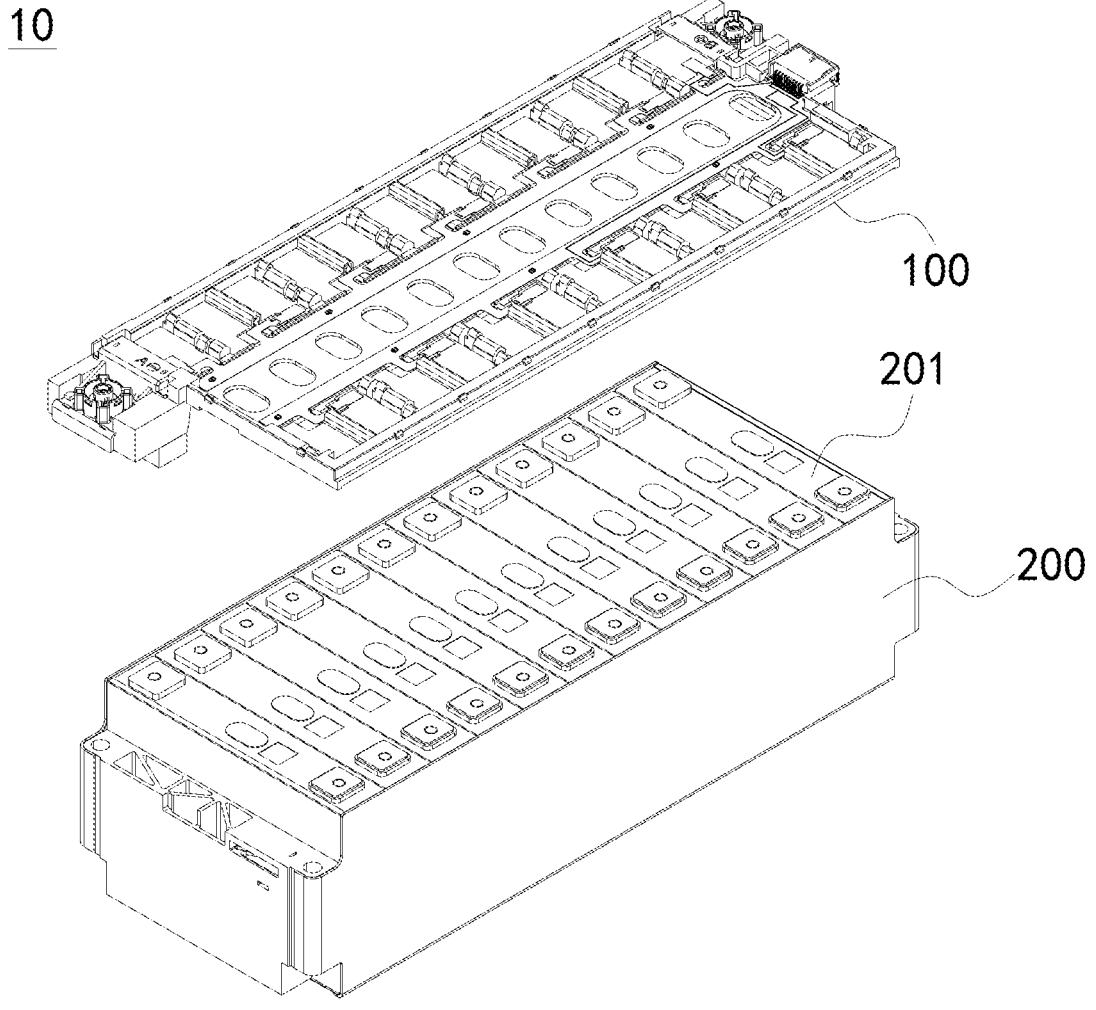
FIG. 1 is a schematic view of a battery pack of a first embodiment of the present disclosure.

Example embodiments will now be described more fully with reference to the accompanying drawings. However, example embodiments, can be implemented in various fouiis and should not be construed as limited to the embodiments set forth herein; rather, these embodiments are provided so that the present disclosure will be thorough and complete, and will fully convey the concept of example embodiments to those skilled in the art. The same reference numerals in the drawings denote the same or similar structures, and thus their detailed descriptions will be omitted.

As shown in FIG. 1, FIG. 1 is a schematic view a battery pack 10 of a first embodiment of the present disclosure. The battery pack 10 of the embodiment of the present disclosure includes a battery connection module 100 and a battery set 200, the battery connection module 100 may be provided above the battery set 200 and is used to connect a plurality of batteries 201 of the battery set 200, the battery connection module 100 is used to detect voltages, temperatures or other battery parameters of the plurality of batteries 201.

It may be understood that the plurality of batteries 201 may be connected in parallel or in series by means of the battery connection module 100.

It is noted that, the term "include", "contain", "has" and any variants thereof are intended to cover nonexclusive inclusion. For example, a process, method, system, product or device containing a series of steps or units is not limited to the step or unit which is listed, but optionally further includes a step or a unit which is not listed, or optionally further includes other step or assembly which is inherent to the process, method, product or device.

Figure 2:
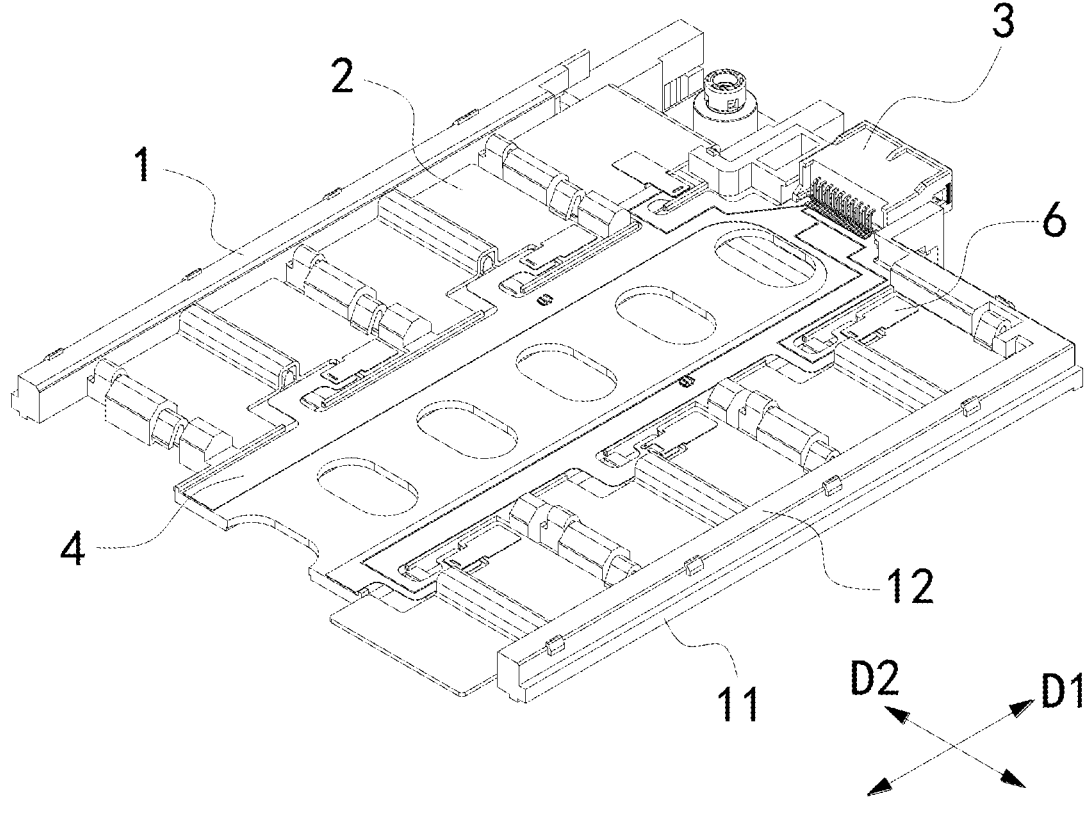
FIG. 2 is a schematic view of a part of a battery connection module of the first embodiment of the present disclosure.
Figure 3:
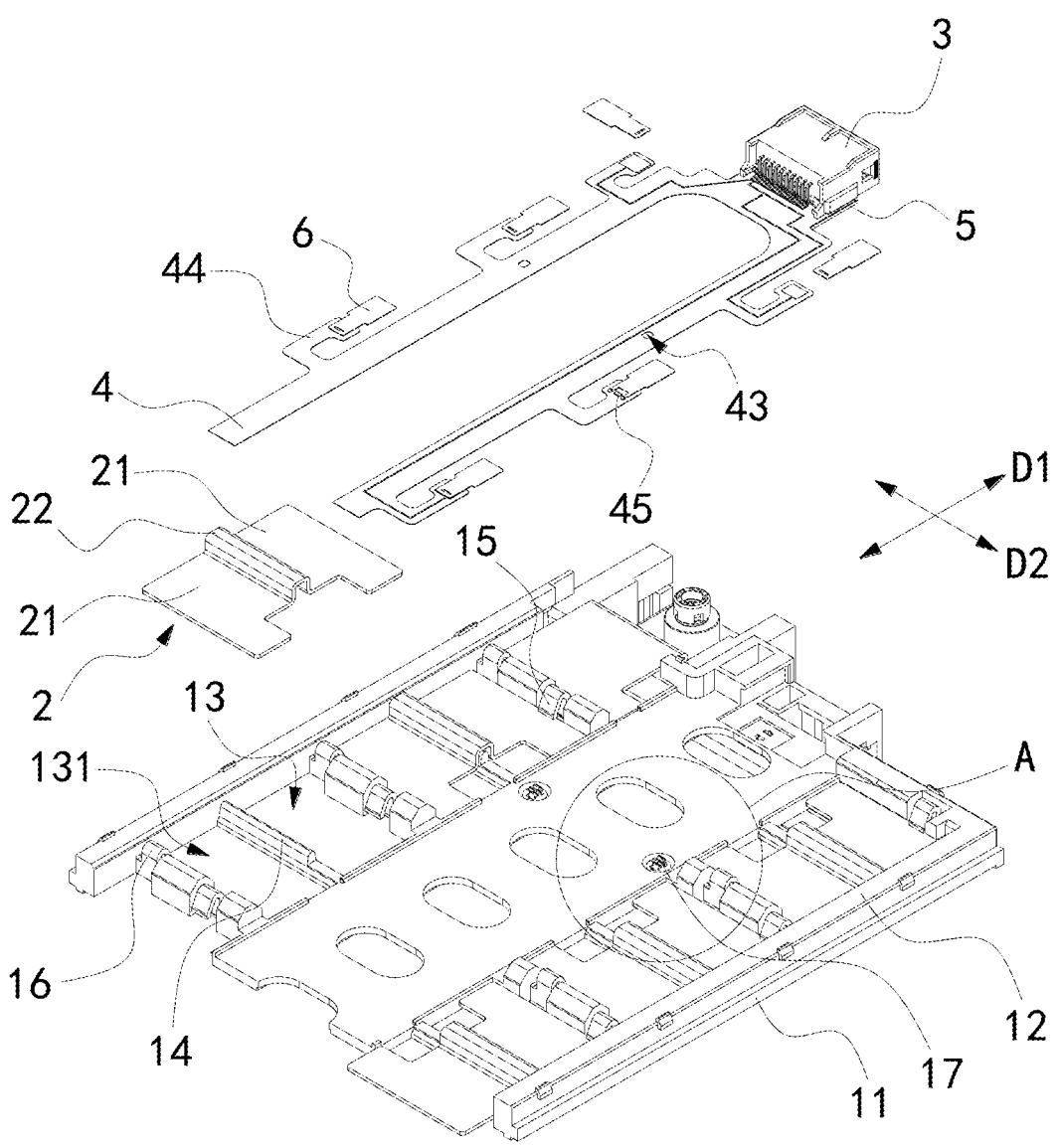
FIG. 3 is an exploded schematic view of FIG. 2.

As shown in FIG. 2 and FIG. 3, FIG. 2 is a schematic view of a part of the battery connection module 100 of the first embodiment of the present disclosure, and FIG. 3 is an exploded schematic view of FIG. 2. The battery connection module 100 of the embodiment of the present disclosure includes a carrying tray 1, a plurality of busbars 2, a connector 3, a single layer wiring flexible circuit board 4 and a strengthening back board 5.

The carrying tray 1, for example, may be integrally formed by an insulating material, and may be a rectangular structure which extends along a length direction D1 and a width direction D2 with the length direction D1 and the width direction D2 being perpendicular to each other.

The carrying tray 1 includes a tray body 11 and a side wall 12 which is integrally constructed to the tray body 11, the side wall 12 is provided at an edge of the tray body 11. The carrying tray 1 includes a plurality of receiving grooves 13, the plurality of receiving grooves 13 are used to receive the plurality of busbars 2 respectively.

The carrying tray 1 further includes a plurality of partitioning walls 16. The plurality of partitioning walls 16 each make one end connected an inner wall of the side wall 12 and make the other end extend toward the interior of the carrying tray 1, so as to partition the plurality of receiving grooves 13. In some embodiments, each partitioning wall 16 may be perpendicular to the side wall 12, but is not limited thereto, for example, the partitioning wall 16 and the side wall 12 also may be provided with an angle.

The carrying tray 1 further includes a plurality of supporting portions 14, each receiving groove 13 is provided with one supporting portion 14 therein. The supporting portion 14 may be an elongated structure, and may be provided parallel to the partitioning wall 16 to partition each receiving groove 13 into two sub-recessed grooves 131. That is to say, along the length direction D1, the supporting portions 14 and the partitioning walls 16 are alternately provided. When the busbar 2 is mounted in the receiving groove 13, the supporting portion 14 is used to support the busbar 2. The two sub-recessed grooves 131 are respectively used to receive two electrode connecting portions 21 of the busbar 2.

The carrying tray 1 further includes a plurality of pressing against members 15, each sub-recessed groove 131 may be provided with one or a plurality of pressing against members 15. Here, "a plurality of" refers to two or more than two. When the busbar 2 is mounted in the receiving groove 13, the pressing against member 15 is capable of pressing against the electrode connecting portion 21 of the busbar 2 to prevent the busbar 2 from being detached from the receiving groove 13. In some embodiments, the pressing against member 15 may be an elastic latch, but is not limited thereto.

It is noted that, under cooperative action of the partitioning walls 16, the supporting portion 14 and the pressing against member 15, the busbar 2 is limited in the receiving groove 13, however, the busbar 2 is not absolutely fixed relative to the carrying tray 1, but the busbar 2 may has a tiny movement relative to the carrying tray 1 so as to accommodate a subsequent ultrasonic welding process.

Figure 8:
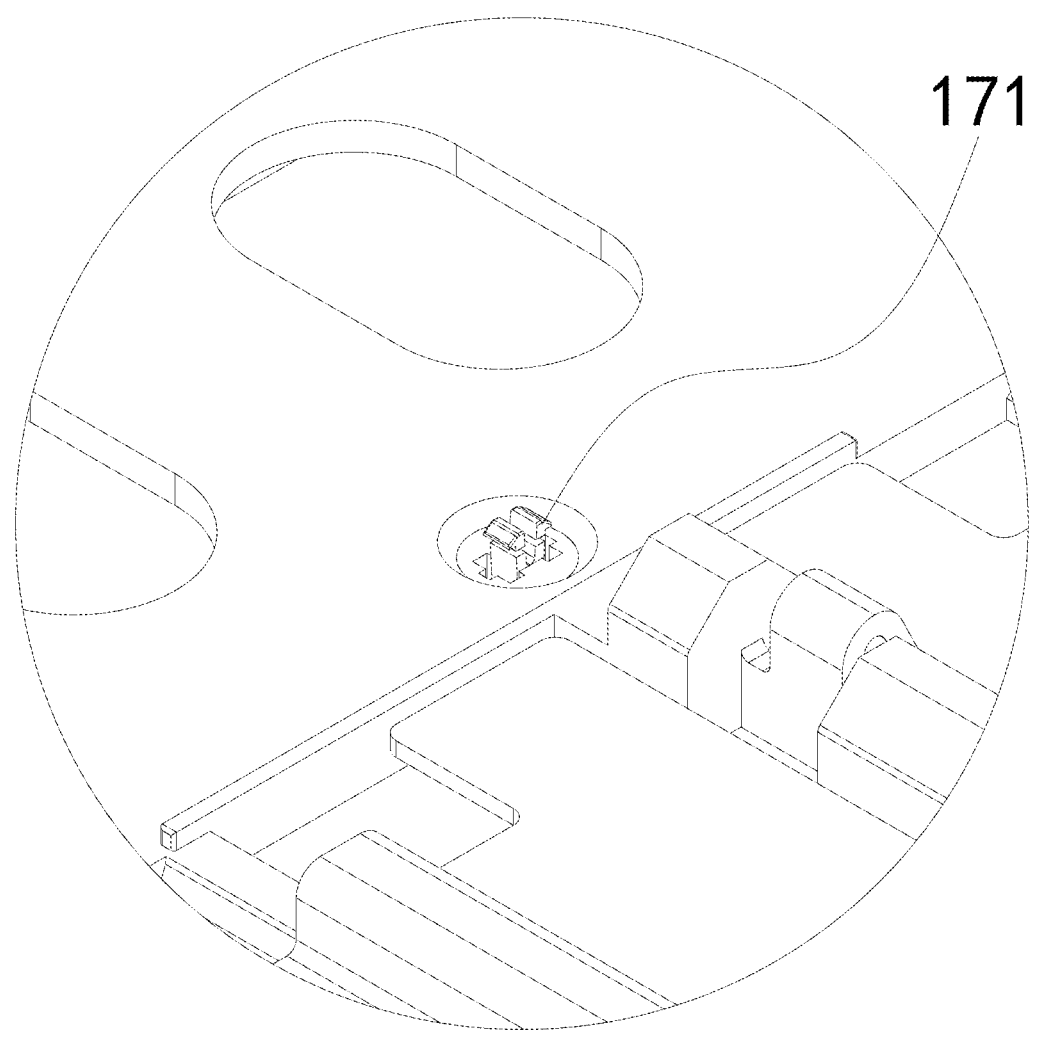
FIG. 8 is a partially enlarged view of FIG. 3 indicated by a circle A.

Continuously referring to FIG. 2 and FIG. 3, the carrying tray 1 further includes a latching post 17, the latching post 17 protrudes from the tray body 11 and is used to latch with a latching hole 43 of the single layer wiring flexible circuit board 4. As shown in FIG. 8, FIG. 8 is a partially enlarged view of FIG. 3 indicated by a circle A. The latching post 17 includes a pair of latching hooks 171 used to latch with the latching hole 43.

The plurality of busbars 2 may be respectively provided in the plurality of receiving grooves 13 of the carrying tray 1, and may be mechanically and electrically connected with electrodes of the respective batteries 201 by welding (for example ultrasonic welding). And, by that the busbars 2 are staggeringly provided, the plurality of batteries 201 constitute a power circuit in series or in parallel from beginning to end.

Each busbar 2 may be integrally formed by bending a conductive material. The plurality of busbars 2 are used to connect the plurality of batteries 201. The busbar 2 has two or more electrode connecting portions 21 and a buffering portion 22 which is positioned between two adjacent electrode connecting portions 21. In the present embodiment, the busbar 2 has two electrode connecting portions 21.

Continuously referring to FIG. 2 and FIG. 3, the single layer wiring flexible circuit board 4 is assembled on the carrying tray 1 and extends along the length direction D1. As described above, the single layer wiring flexible circuit board 4 has the latching hole 43, when the single layer wiring flexible circuit board 4 and the carrying tray 1 are assembled, the latching post 17 and the latching hole 43 latch with each other.

The single layer wiring flexible circuit board 4 includes a plurality of flexible supporting arms 44 which extend out from the single layer wiring flexible circuit board 4 and are used to connect the plurality of busbars 2.

The battery connection module 100 of the embodiment of the present disclosure further includes a plurality of metal bridging pieces 6, one end of the metal bridging piece 6 is connected to the flexible supporting arm 44, and the other end of the metal bridging piece 6 is connected to the busbar 2.

In some embodiments, the metal bridging piece 6 may be connected to the flexible supporting arm 44 and the busbar 2 by welding.

It is noted that, each metal bridging piece 6 may be connected with a voltage collecting circuit trace (not shown) of the single layer wiring flexible circuit board 4 for collecting a voltage. And, the metal bridging piece 6 connected with the voltage collecting circuit trace is adjacent to a temperature sensor 45, the temperature sensor 45 is provided on the flexible supporting arm 44, the temperature sensor 45 may be connected with a temperature collecting circuit trace (not shown) of the single layer wiring flexible circuit board 4.

It may be understood that, a material of the metal bridging piece 6 may be a metal material having good thermal conductivity (for example, an aluminum piece), or may be a metal material having both thermal conductivity and electrical conductivity (for example, a nickel piece).

The connector 3 is connected to the single layer wiring flexible circuit board 4, and is capable of being connected with a battery management system (not shown) so as to transmit temperature information and/or voltage information collected by the single layer wiring flexible circuit board 4 to the battery management system.

The strengthening back board 5 corresponds to the connector 3 in position and is provided to the single layer wiring flexible circuit board 4.

Figure 4:
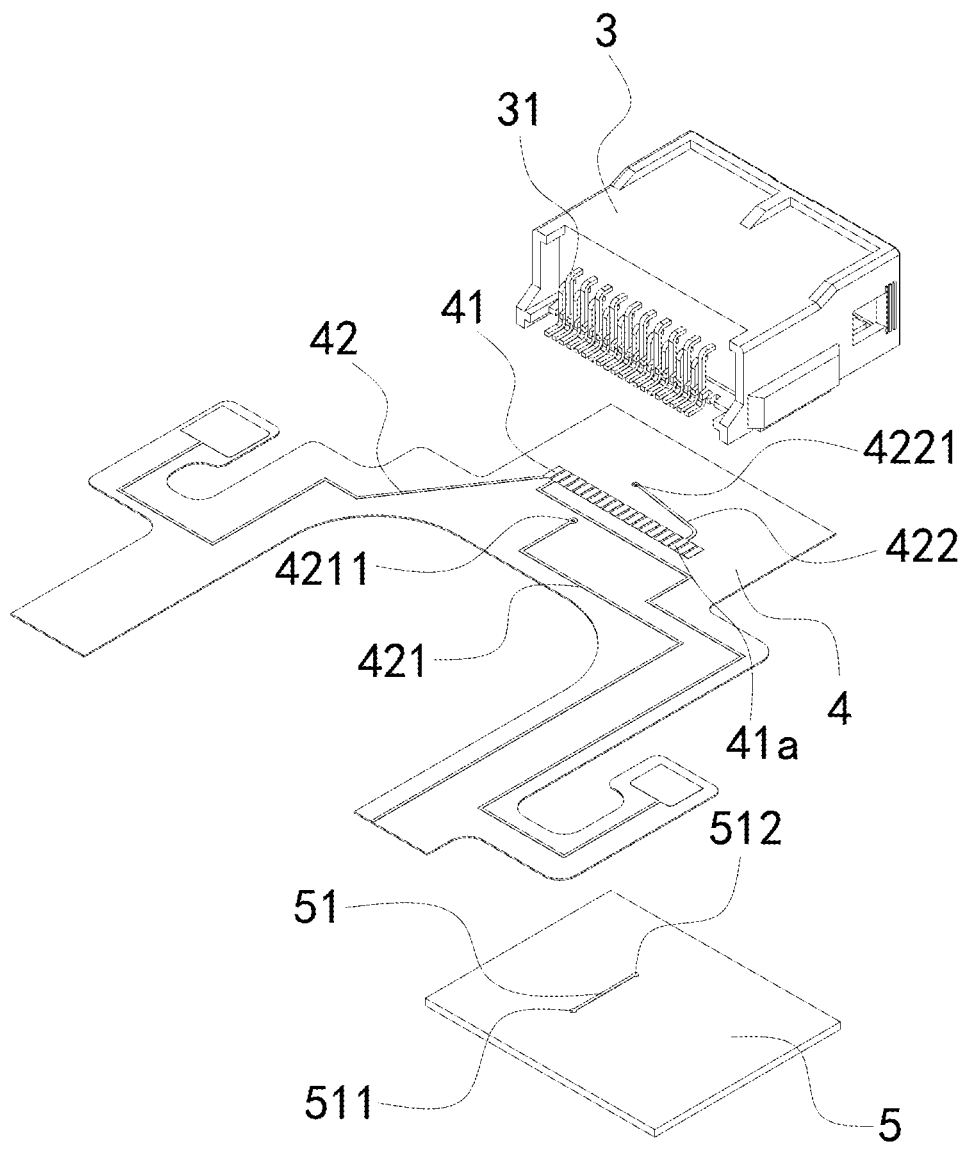
FIG. 4 is an exploded schematic view of a connector, a single layer wiring flexible circuit board and a strengthening back board of the first embodiment of the present disclosure.

As shown in FIG. 4, FIG. 4 is an exploded schematic view of the connector 3, the single layer wiring flexible circuit board 4 and the strengthening back board 5 of the first embodiment of the present disclosure. The single layer wiring flexible circuit board 4 is positioned between the connector 3 and the strengthening back board 5. The connector 3 includes a plurality of conductive terminals 31, each conductive terminal 31 is made from a conductive material and is integrally formed by bending.

The single layer wiring flexible circuit board 4 includes a plurality of terminal connecting points 41 and multiple traces 42 which are connected with respective terminal connecting points 41. The plurality of busbar 2 are connected to the plurality of terminal connecting points 41 by the multiple traces 42. The plurality of conductive terminals 31 of the connector 3 are connected with the plurality of terminal connecting points 41 correspondingly. It is noted that, in order to clearly illustrate a structure or construction of the single layer wiring flexible circuit board 4, FIG. 4 only illustrates a part of the multiple traces 42.

The strengthening back board 5 is provided with an adapting trace 51 thereon, the multiple traces 42 of the single layer wiring flexible circuit board 4 include at least one first trace 421, the first trace 421 is connected to the terminal connecting point 41 of the single layer wiring flexible circuit board 4 via the adapting trace 51. Here, the first trace 421 is a trace which is required to be jumped or spanned on the single layer wiring flexible circuit board 4.

In the embodiments of the present disclosure, the terms "first", "second" and "third" are only used for the purpose of description, and cannot be construed as indicating or implying relative importance.

As such, the first trace 421 required to be jumped or spanned on the single layer wiring flexible circuit board 4 is adapted to the strengthening back board 5 and is adapted back to the terminal connecting point 41 of the single layer wiring flexible circuit board 4, so that the strengthening back board 5 functions as not only assembling the connector 3 but also an adapting circuit board for jumping or spanning Such a manner that directly uses the strengthening back board 5 to solve circuit cross wiring is capable of applying the single layer wiring flexible circuit board 4 on the battery connection module 100 and solving a problem on circuit cross, which significantly lowers cost.

It is noted that, the single layer wiring flexible circuit board 4 refers to a flexible circuit board that conductive traces are arranged in a single plane, so all the conductive traces of the single layer wiring flexible circuit board 4 cannot cross each other. In addition to a wiring layer with respect to the traces, the single layer wiring flexible circuit board 4 may at least include an insulating substrate which allows the conductive traces to be provided and an insulating layer which covers the conductive traces.

In addition, it may be understood that, the traces of the single layer wiring flexible circuit board 4 may be connected with the busbars 2, of course, also may be connected with the temperature sensors 45.

It is noted that, the terms "mounted", "connected with", "connect" and the like should be understood in a broad sense, "connect" either may be direct connection or may be indirect connection via an intermediary. Those of ordinary skill in the art can understand the specific meanings of the above terms in the embodiments of the present disclosure according to specific situations.

Continuously referring to FIG. 4, the multiple traces 42 further include a second trace 422. The first trace 421 is adapted to one end of the adapting trace 51, the other end of the adapting trace 51 is adapted back to the second trace 422 of the single layer wiring flexible circuit board 4.

Specifically, a tip of the first trace 421 has an end portion connecting point 4211, one end of the adapting trace 51 has a first end portion connecting point 511 and the other end of the adapting trace 51 has a second end portion connecting point 512. The end portion connecting point 4211 of the first trace 421 is connected to the first end portion connecting point 511 of the adapting trace 51, the second end portion connecting point 512 of the adapting trace 51 connected to the end portion connecting point 4221 of the second trace 422.

The end portion connecting point 4211 of the first trace 421 is constructed as a conductive through hole, and the conductive through hole penetrates an upper surface and a lower surface of the single layer wiring flexible circuit board 4. And, conductive rings which are circle surround openings of the conductive through hole on the upper surface and the lower surface respectively, an inner wall of the conductive through hole is provided with a conductive layer. The first end portion connecting point 511 and the second end portion connecting point 512 at two ends of the adapting trace 51 are constructed as enlarged conductive pads. The conductive through hole of the first trace 421 of the end portion connecting point 4211 may be connected with the first end portion connecting point 511 of the adapting trace 51 by welding. The end portion connecting point 4221 of the second trace 422 also is constructed as a conductive through hole, the conductive through hole of the second trace 422 may be connected with the second end portion connecting point 512 of the adapting trace 51 by welding.

That is to say, the end portion connecting point 4211 of the first trace 421 is adapted to the first end portion connecting point 511 of the adapting trace 51 by welding, the second end portion connecting point 512 of the adapting trace 51 is adapted to the end portion connecting point 4221 of the second trace 422 by welding, finally an object that the first trace 421 required to be jumped or spanned is adapted to the strengthening back board 5 and then adapted back to a first terminal connecting point 41a of the single layer wiring flexible circuit board 4 is attained. Here, the first terminal connecting point 41a is one of the plurality of terminal connecting points 41, and is the terminal connecting point 41 to which the tip of the first trace 421 required to jumped or spanned is adapted.

In the present embodiment, the connector 3 is mounted on the single layer wiring flexible circuit board 4 with surface mounted technology (SMT). The plurality of terminal connecting point 41 each are constructed as a terminal connecting point 41 which employs a surface welding pad form, tail portions of the plurality of conductive terminals 31 are surface welded to the respective terminal connecting points 41 of the single layer wiring flexible circuit board 4.

Figure 5:
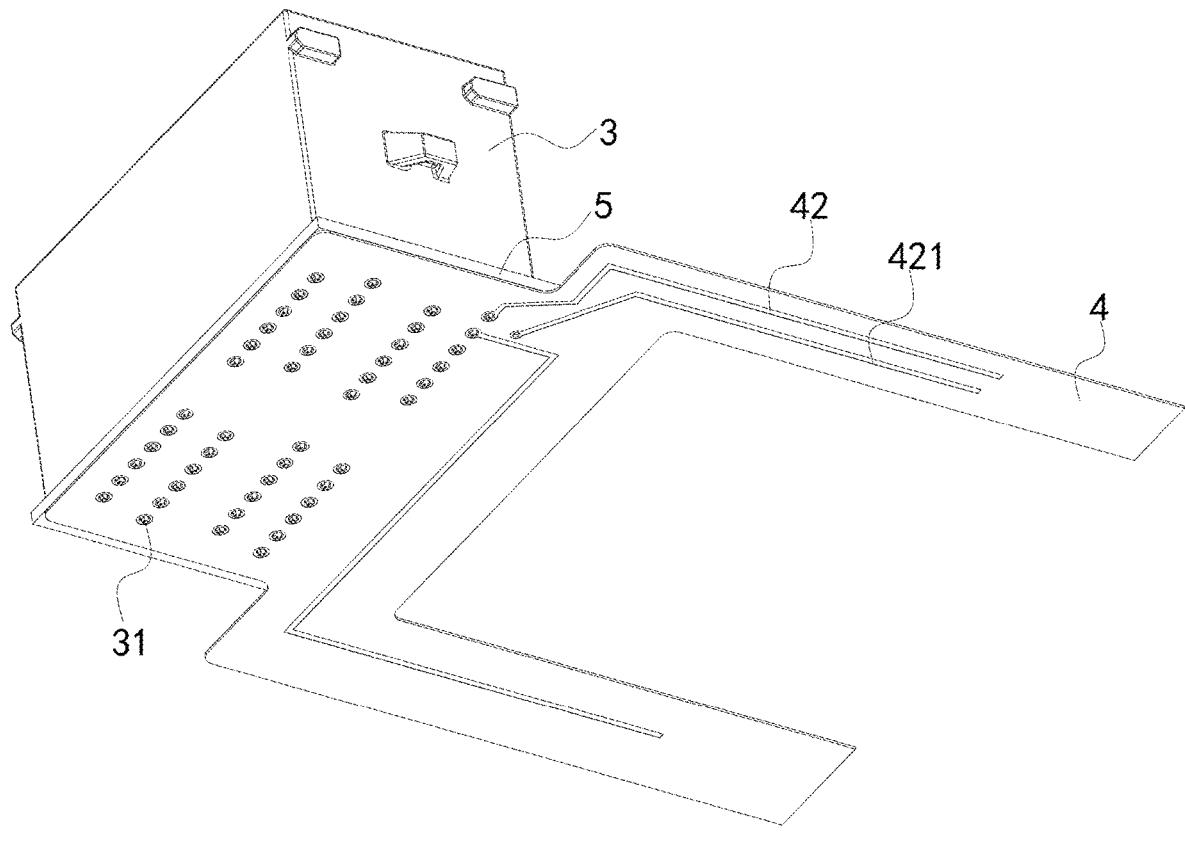
FIG. 5 is a schematic view of a connector, a single layer wiring flexible circuit board and a strengthening back board of a second embodiment of the present disclosure after assembled.
Figure 6:
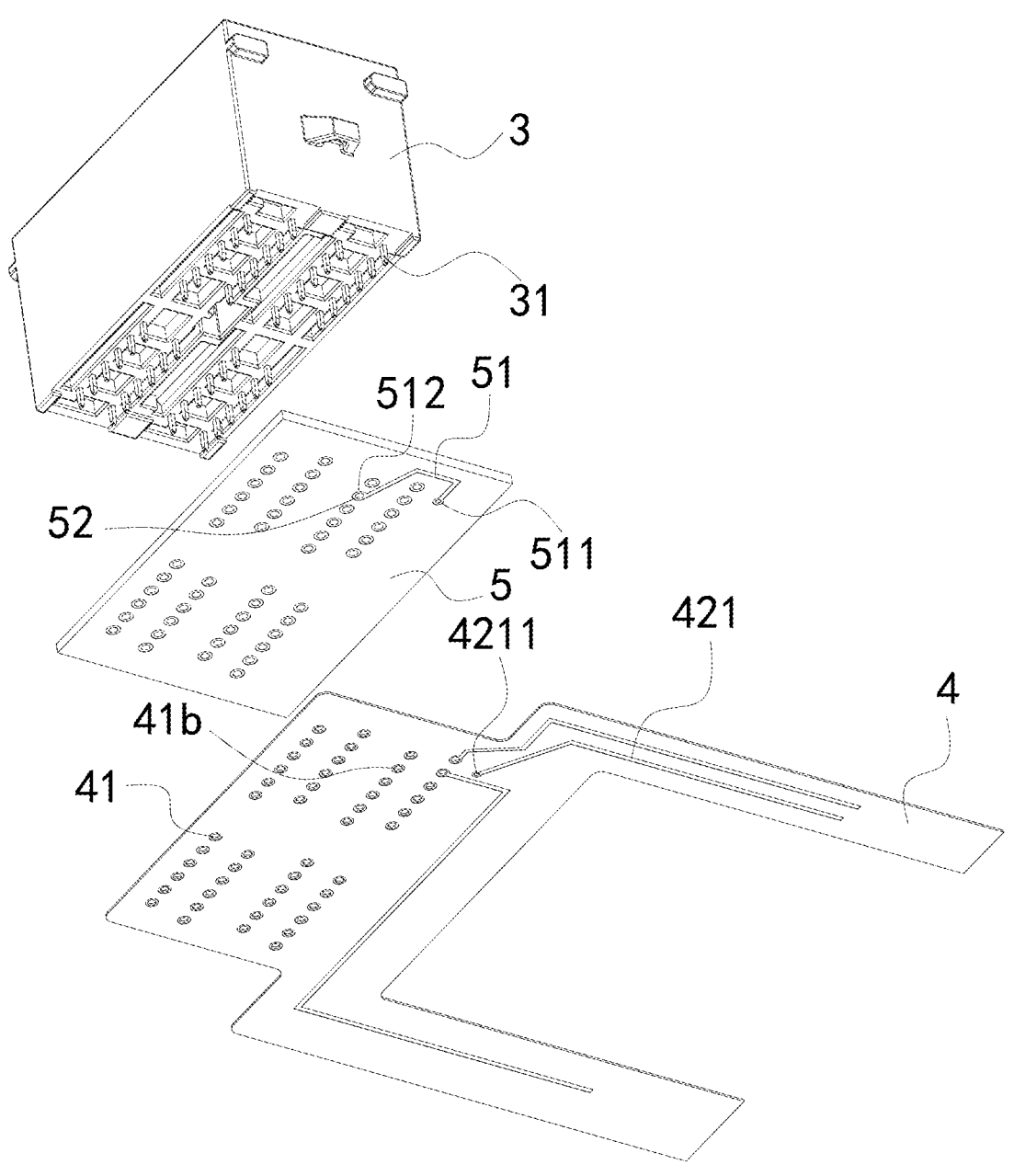
FIG. 6 is an exploded schematic view of FIG. 5.

As shown in FIG. 5 and FIG. 6, FIG. 5 is a schematic view of a connector 3, a single layer wiring flexible circuit board 4 and a strengthening back board 5 of a second embodiment of the present disclosure after assembled, and FIG. 6 is an exploded schematic view of FIG. 5. A connected manner of the connector 3, the single layer wiring flexible circuit board 4 and the strengthening back board 5 of the second embodiment of the present disclosure differs from the first embodiment in that: the connector 3 of the present embodiment is mounted on the single layer wiring flexible circuit board 4 with through hole type and non-void pin type, and the end portion connecting point 4211 of the first trace 421 is adapted to the first end portion connecting point 511 of the adapting trace 51, the second end portion connecting point 512 of the adapting trace 51 is directly connected to a second terminal connecting point 41b of the single layer wiring flexible circuit board 4. Here, the second terminal connecting point 41b is one of the plurality of terminal connecting points 41, and is the terminal connecting point 41 to which a tip of the first trace 421 required to be jumped or spanned is adapted.

Specifically, the connector 3 is mounted on the single layer wiring flexible circuit board 4 with through hole type, and the connector 3 is non-void pin type. The connector 3 has a plurality of conductive terminals 31, and each conductive terminal 31 is pin type. The terminal plurality of connecting points 41 of the single layer wiring flexible circuit board 4 each are constructed as a conductive through hole, and the conductive through hole penetrates an upper surface and a lower surface of the single layer wiring flexible circuit board 4. And, conductive rings which are circle surround openings of the conductive through hole at the upper surface and the lower surface respectively, an inner wall of the conductive through hole is provided with a conductive layer.

The plurality of conductive terminals 31 pass through the conductive through holes by one to one correspondence, and electrical connection between the connector 3 and the single layer wiring flexible circuit board 4 is attained by welding.

The strengthening back board 5 is positioned between the connector 3 and the single layer wiring flexible circuit board 4, and includes a plurality of penetrating holes 52, each penetrating hole 52 is constructed as a conductive through hole, the plurality of penetrating holes 52, the plurality of conductive terminals 31 of the connector 3 and the plurality of terminal connecting points 41 correspond to each other by one to one, that is, tail portions of the plurality of conductive terminals 31 respectively pass through the plurality of penetrating holes 52 and the plurality of terminal connecting points 41 by one to one correspondence.

The end portion connecting point 4211 of the first trace 421 is constructed as a conductive through hole, the first end portion connecting point 511 of the adapting trace 51 is constructed as a conductive through hole, the second end portion connecting point 512 of the adapting trace 51 is constructed on one penetrating hole 52 of the strengthening back board 5 and is constructed as a conductive through hole.

As such, the connector 3 of the present embodiment employs through hole type and is non-void pin type, the tail portions of the plurality of conductive terminals 31 respectively pass through the plurality of penetrating holes 52 of the strengthening back board 5 and are respectively welded to the plurality of terminal connecting points 41 (the through hole type terminal connecting points 41) of the single layer wiring flexible circuit board 4. The first trace 421 of the single layer wiring flexible circuit board 4 required to be jumped or spanned is adapted to the adapting trace 51 on the strengthening back board 5, and then is directly adapted to the second terminal connecting point 41b (the through hole type terminal connecting point) of the single layer wiring flexible circuit board 4 by the adapting trace 51.

Figure 7:
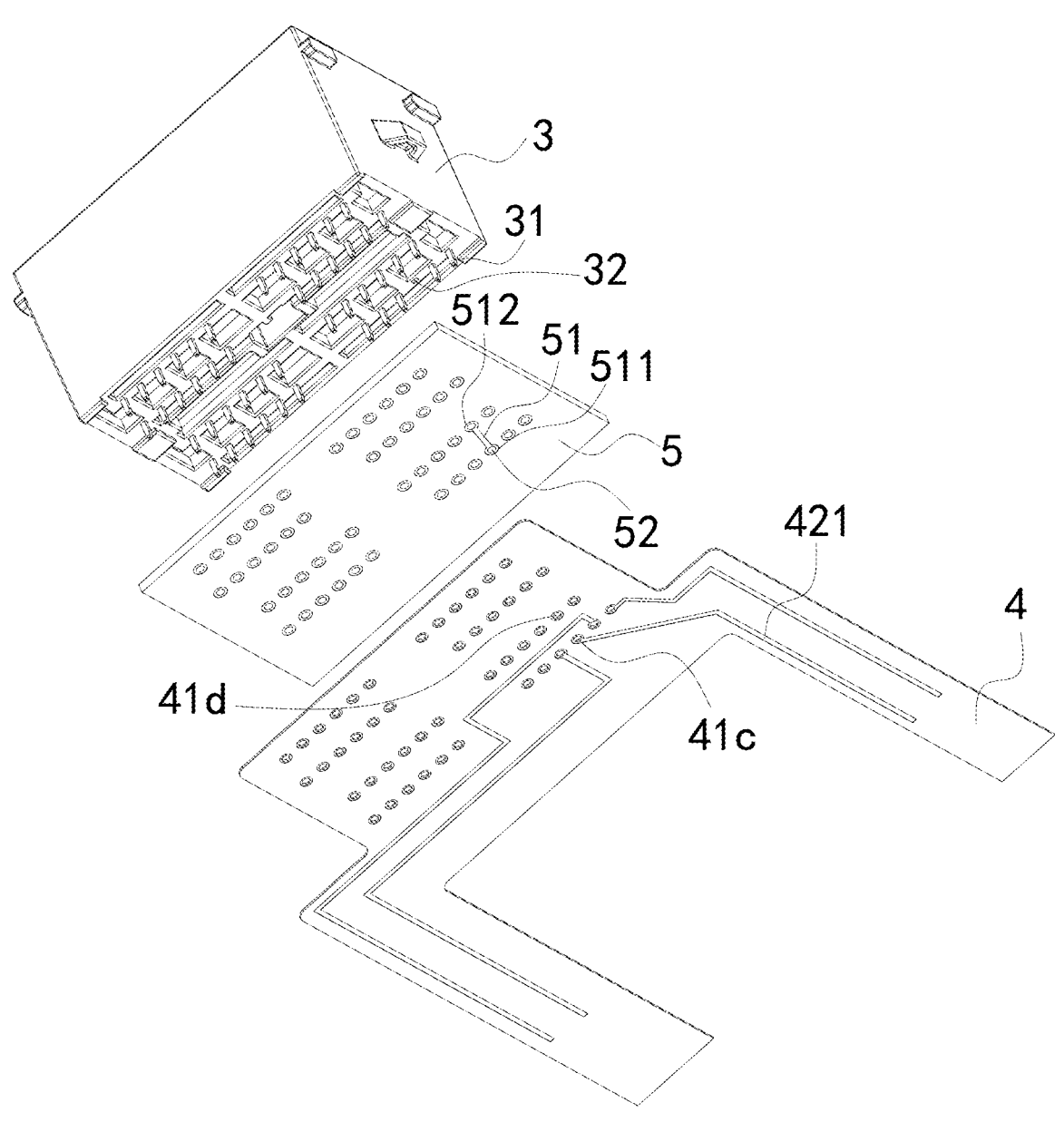
FIG. 7 is an exploded schematic view of a connector, a single layer wiring flexible circuit board and a strengthening back board of a third embodiment of the present disclosure.

As shown in FIG. 7, FIG. 7 is an exploded schematic view of a connector 3, a single layer wiring flexible circuit board 4 and a strengthening back board 5 of a third embodiment of the present disclosure. A connected manner of the connector 3, the single layer wiring flexible circuit board 4 and the strengthening back board 5 of the third embodiment of the present disclosure differs from the second embodiment in that: a tip of the first trace 421 is connected on a third terminal connecting point 41c, the first trace 421 is connected to the first end portion connecting point 511 of the adapting trace 51 via the third terminal connecting point 41c, the second end portion connecting point 512 of the adapting trace 51 is directly connected to a fourth terminal connecting point 41d of the single layer wiring flexible circuit board 4.

Specifically, the connector 3 is mounted on the single layer wiring flexible circuit board 4 with through hole type, and connector 3 is a void pin type. The connector 3 has a plurality of conductive terminals 31, each conductive terminal 31 is pin type. The plurality of terminal connecting points 41 of the single layer wiring flexible circuit board 4 each are constructed as a conductive through hole, the strengthening back board 5 is positioned between the connector 3 and the single layer wiring flexible circuit board 4, and includes a plurality of penetrating holes 52, each penetrating hole 52 is constructed as a conductive through hole.

It is noted that, that the connector 3 is a void pin type refers to that the connector 3 is at least assembled with one conductive terminal 31, a position of the connector 3 where there is not conductive terminal to be assembled constitutes a void pin 32, the terminal connecting point 41 of the single layer wiring flexible circuit board 4 which corresponds to the void pin 32 in position is not connected. That is to say, at least one of the plurality of terminal connecting points 41 of the single layer wiring flexible circuit board 4 is not connected to the conductive terminal 31 of the connector 3.

In the present embodiment, both the third terminal connecting point 41c and the fourth terminal connecting point 41d are two different terminal connecting points 41 positioned on the single layer wiring flexible circuit board 4, here, the third terminal connecting point 41c is an void terminal connecting point 41 corresponding to the void pin 32, the fourth terminal connecting point 41d is the terminal connecting point 41 to which the tip of the first trace 421 required to be jumped or spanned is adapted.

The first end portion connecting point 511 and the second end portion connecting point 512 of the adapting trace 51 are respectively constructed on the two penetrating holes 52 of the strengthening back board 5, and are conductive through hole structures. One penetrating hole 52 of the two penetrating holes 52 corresponds to the void pin 32 of the connector 3, that is, the one penetrating hole 52 also corresponds to the void third terminal connecting point 41c.

The first trace 421 is connected on the void third terminal connecting point 41c which corresponds to the void pin 32 of the connector 3, and is adapted to the first end portion connecting point 511 of the adapting trace 51 by welding. The second end portion connecting point 512 of the adapting trace 51 is directly connected to the fourth terminal connecting point 41d of the single layer wiring flexible circuit board 4.

As such, the present embodiment connector 3 is through hole type and is a void pin type, the tail portions of the plurality of conductive terminals 31 passes through the respective penetrating holes 52 of the strengthening back board 5 and are welded to the respective terminal connecting points 41 (the through hole type terminal connecting points) of the single layer wiring flexible circuit board 4. The first trace 421 of the single layer wiring flexible circuit board 4 required to be jumped or spanned is connected to the adapting trace 51 on the strengthening back board 5 via the void third terminal connecting point 41c which corresponds to the void pin 32, and then is directly connected to the fourth terminal connecting point 41d (the through hole type terminal connecting point) of single layer wiring flexible circuit board 4 via the adapting trace 51.

In conclusion, advantages and beneficial effects of the battery connection module 100 of the embodiments of the present disclosure at least include: the first trace 421 required to be jumped or spanned on the single layer wiring flexible circuit board 4 is adapted to the strengthening back board 5 and is adapted back to the terminal connecting point 41 of the single layer wiring flexible circuit board 4, so that the strengthening back board 5 functions as not only assembling the connector 3 but also an adapting circuit board for jumping or spanning. Such a manner that directly uses the strengthening back board 5 to solve circuit cross wiring is capable of applying the single layer wiring flexible circuit board 4 on the battery connection module 100 and solving a problem on circuit cross, which significantly lowers cost.

In the description of the embodiments of the present disclosure, it should be understood that the orientations or positional relationships indicated by the terms "upper", "lower", "left", "right", "front", "rear", etc. are based on those shown in the accompanying drawings. The orientation or positional relationship is only for the convenience of describing the embodiments of the disclosure and simplifying the description, rather than indicating or implying that the device or unit referred to must have a specific direction, be constructed and operated in a specific orientation, and therefore should not be construed as limit to embodiments of present disclosure.

In the description of this specification, the description of the terms "one embodiment", "some embodiments", "specific embodiment", etc. means that a specific feature, structure, material or characteristic described in connection with the embodiment or example is included in at least one embodiment or example of embodiments of the present disclosure. In this specification, schematic expressions of the above terms do not necessarily refer to the same embodiment or example. Furthermore, the specific feature, structure, material or characteristic described may be combined in any suitable manner in any one or more embodiments or examples The above are only preferred embodiments of the embodiments of the present disclosure, and are not intended to limit the embodiments of the present disclosure. For those skilled in the art, the embodiments of the present disclosure may have various modifications and changes. Any modifications, equivalent replacements, improvements, etc. made within the spirit and principles of the embodiments of the present disclosure should be included within the protection scope of the embodiments of the present disclosure.

What is claimed is:

1. A battery connection module used to connect a plurality of batteries, comprising:

a plurality of busbars used to connect the plurality of batteries;

a connector comprising a plurality of conductive terminals;

a single layer wiring flexible circuit board comprising a plurality of terminal connecting points and multiple traces which are connected with respective terminal connecting points, the multiple traces comprising at least one first trace, the plurality of terminal connecting points being electrically connected to the plurality of conductive terminals;

a strengthening back board corresponding to the connector in position and provided on the single layer wiring flexible circuit board, the strengthening back board being provided with an adapting trace thereon, the adapting trace comprising a first end portion connecting point at a first end thereof and a second end portion connecting point at a second opposite end thereof; and wherein the first end portion connecting point of the adapting trace on the strengthening back board is electrically coupled to the first trace on the single layer wiring flexible circuit board and the second end portion connecting point of the adapting trace on the strengthening back board is electrically coupled to one of the plurality of terminal connecting points of the single layer wiring flexible circuit board.

2. The battery connection module according to claim 1, further comprising a second trace on the single layer wiring flexible circuit board, wherein the second end portion connecting point of the adapting trace on the strengthening back board is electrically coupled to the one of the plurality of terminal connecting points of the single layer wiring flexible circuit board by the second trace.

3. The battery connection module according to claim 2, wherein the single layer wiring flexible circuit board is positioned between the connector and the strengthening back board; and the connector employs surface mounted technology, the plurality of terminal connecting points each are constructed as a terminal connecting point which employs a surface welding pad form, tail portions of the plurality of conductive terminals are surface welded to the respective terminal connecting points of the single layer wiring flexible circuit board.

4. The battery connection module according to claim 1, wherein one of the plurality of terminal connecting points defines a first terminal connecting point;

a tip of the first trace has an end portion connecting point; and the end portion connecting point of the first trace is connected to the first end portion connecting point of the adapting trace, the second end portion connecting point of the adapting trace is directly connected to the first terminal connecting point of the single layer wiring flexible circuit board.

5. The battery connection module according to claim 4, wherein the connector employs through hole type and is non-void pin type;

the plurality of terminal connecting points each are constructed as a through hole type terminal connecting point;

the strengthening back board comprises a plurality of penetrating holes;

tail portions of the plurality of conductive terminals respectively pass through the plurality of penetrating holes of the strengthening back board and are respectively welded to the plurality of terminal connecting points which each are constructed as the through hole type terminal connecting point; and the second end portion connecting point of the adapting trace is constructed on one of the plurality of penetrating holes of the strengthening back board.

6. The battery connection module according to claim 1, wherein one of the plurality of terminal connecting points defines a first terminal connecting point and a second terminal connecting point;

a tip of the first trace is connected to the first terminal connecting point; and the first trace is connected to the first end portion connecting point of the adapting trace via the first terminal connecting point, the second end portion connecting point of the adapting trace is directly connected to the second terminal connecting point of the single layer wiring flexible circuit board.

7. The battery connection module according to claim 6, wherein the connector employs through hole type and is a void pin type;

the plurality of terminal connecting point each are constructed as a through hole type terminal connecting point;

the strengthening back board comprises a plurality of penetrating holes;

tail portions of the plurality of conductive terminals pass through the respective penetrating holes of the strengthening back board and are welded to the respective terminal connecting points which each are constructed as the through hole type terminal connecting point;

the first trace is connected on the first terminal connecting point which is void and corresponds to a void pin of the connector; and the first end portion connecting point and the second end portion connecting point of the adapting trace are respectively constructed on two of the plurality of penetrating holes of the strengthening back board.

8. The battery connection module according to claim 4, wherein the strengthening back board is positioned between the connector and the single layer wiring flexible circuit board.

9. The battery connection module according to claim 5, wherein the strengthening back board is positioned between the connector and the single layer wiring flexible circuit board.

10. The battery connection module according to claim 6, wherein the strengthening back board is positioned between the connector and the single layer wiring flexible circuit board.

11. The battery connection module according to claim 7, wherein the strengthening back board is positioned between the connector and the single layer wiring flexible circuit board.

12. The battery connection module according to claim 2, wherein the first trace has an end portion connecting point connected to the first end portion connecting point of the adapting trace, the end portion connecting point of the first trace is a conductive through hole, the first end portion connecting point of the adapting trace is a conductive pad, the second end portion connecting point of the adapting trace is a conductive pad.

13. The battery connection module according to claim 3, wherein the first trace has an end portion connecting point connected to the first end portion connecting point of the adapting trace, the end portion connecting point of the first trace is a conductive through hole, the first end portion connecting point of the adapting trace is a conductive pad, the second end portion connecting point of the adapting trace is a conductive pad.

* * * * *